United States Patent
Amit et al.

(10) Patent No.: US 10,826,785 B2
(45) Date of Patent: Nov. 3, 2020

(54) DATA TRAFFIC MONITORING TOOL

(71) Applicant: INTERNATIONAL BUSINESS MACHINES CORPORATION, Armonk, NY (US)

(72) Inventors: Jonathan Amit, Omer (IL); Lior Chen, Jerusalem (IL); Vladislav Drouker, Holon (IL); Osnat Shasha, Holon (IL)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 407 days.

(21) Appl. No.: 14/865,601

(22) Filed: Sep. 25, 2015

(65) Prior Publication Data
US 2017/0093668 A1 Mar. 30, 2017

(51) Int. Cl.
*H04L 12/26* (2006.01)
*H04L 12/24* (2006.01)

(52) U.S. Cl.
CPC ........ *H04L 41/142* (2013.01); *H04L 41/5025* (2013.01); *H04L 43/08* (2013.01); *H04L 41/16* (2013.01)

(58) Field of Classification Search
CPC ........... G06F 2003/0697; G06F 3/0604; G06F 3/0653; G06F 3/0662; G06F 3/0665;
(Continued)

(56) References Cited

U.S. PATENT DOCUMENTS 5,898,863 A * 4/1999 Ofer .................... G06F 11/3457
703/13

6,088,333 A 7/2000 Yang et al.
(Continued)

FOREIGN PATENT DOCUMENTS

WO 02089014 A1 11/2002

OTHER PUBLICATIONS

Liu, "Development of TOSCA Service Templates for provisioning portable IT Services", 77 pages, Diploma Thesis, Institute of Parallel and Distributed Systems, University of Stuttgart.
(Continued)

*Primary Examiner* — Jason D Recek
*Assistant Examiner* — Ranjan Pant
(74) *Attorney, Agent, or Firm* — Griffiths and Seaton PLLC (57) ABSTRACT

Methods, computing systems and computer program products implement embodiments of the present invention that include detecting, on a communications network in a computing facility including a first computer coupled to a second computer via the communications network, an input/output (I/O) request conveyed from the first computer to the second computer. Subsequent to detecting the I/O request, data traffic resulting from the second computer processing the I/O request is identified on the communications network, and network statistics are collected based on the I/O request and the data traffic. Upon detecting a performance degradation of the computing facility, the performance degradation greater than a predetermined amount, heuristics can be applied to the collected network statistics, to identify a cause of the performance degradation and to identify a remedy to the detected performance degradation. In some embodiments, the identified cause and the identified remedy can be presented to a user on a display.

15 Claims, 3 Drawing Sheets

(58) Field of Classification Search
CPC ...... G06F 3/067; G06F 9/5072; G06F 11/201; H04L 67/1002; H04L 67/1008; H04L 41/5035; H04L 43/04; H04L 43/065; H04L 43/067; H04L 43/0876; H04L 67/1097; H04L 69/16; H04L 43/10; H04L 43/16; H04L 43/12; H04L 43/062; H04L 43/18; H04L 43/00
See application file for complete search history.

(56) References Cited

U.S. PATENT DOCUMENTS

| | | | |
|---|---|---|---|
| 6,400,682 | B1 | 6/2002 | Regula |
| 6,826,613 | B1* | 11/2004 | Wang .................. G06F 3/0607 709/202 |
| 6,985,937 | B1* | 1/2006 | Keshav .................. G06F 9/505 370/231 |
| 7,197,014 | B2 | 3/2007 | Katsuyama et al. |
| 7,203,944 | B1 | 4/2007 | van Rietschote et al. |
| 7,725,572 | B1* | 5/2010 | Kautzleben ............. H04L 43/00 709/224 |
| 7,765,256 | B2 | 7/2010 | Doshi et al. |
| 8,065,660 | B1 | 11/2011 | Tanner et al. |
| 8,150,037 | B2 | 4/2012 | Luk et al. |
| 8,291,416 | B2 | 10/2012 | Cartales |
| 8,627,334 | B2 | 1/2014 | Archer et al. |
| 8,775,626 | B2 | 7/2014 | Teather et al. |
| 8,793,377 | B2 | 7/2014 | Aderson, III |
| 8,954,587 | B2 | 2/2015 | Gusak |
| 9,047,136 | B2 | 6/2015 | Thanga et al. |
| 9,172,713 | B2 | 10/2015 | Joffe et al. |
| 9,319,300 | B2 | 4/2016 | Huynh Van et al. |
| 9,344,494 | B2 | 5/2016 | Mordani et al. |
| 9,460,711 | B1 | 10/2016 | Vanhoucke et al. |
| 9,569,233 | B2 | 2/2017 | Masters et al. |
| 9,582,209 | B2 | 2/2017 | Shih et al. |
| 9,648,004 | B2 | 5/2017 | Joffe et al. |
| 9,911,212 | B2 | 3/2018 | Fowler et al. |
| 9,960,964 | B2 | 5/2018 | Alam et al. |
| 2002/0035647 | A1* | 3/2002 | Brown .................. G06Q 30/02 719/312 |
| 2002/0145978 | A1 | 10/2002 | Batsell et al. |
| 2002/0166031 | A1 | 11/2002 | Chen et al. |
| 2002/0194324 | A1 | 12/2002 | Guha |
| 2002/0194429 | A1 | 12/2002 | Chiu et al. |
| 2004/0010545 | A1* | 1/2004 | Pandya .................. H04L 29/06 709/203 |
| 2004/0210320 | A1* | 10/2004 | Pandya .................. H04L 29/06 700/1 |
| 2006/0069761 | A1 | 3/2006 | Singh et al. |
| 2006/0195444 | A1 | 8/2006 | Sastry et al. |
| 2008/0141264 | A1 | 6/2008 | Johnson |
| 2009/0049338 | A1 | 2/2009 | Unnikrishnan et al. |
| 2009/0125496 | A1* | 5/2009 | Wexler ............. G06F 17/30483 |
| 2009/0168645 | A1* | 7/2009 | Tester ................. H04L 41/0677 370/225 |
| 2009/0172666 | A1 | 7/2009 | Yahalom et al. |
| 2010/0008248 | A1* | 1/2010 | Constantine ............ H04L 43/50 370/252 |
| 2010/0269109 | A1 | 10/2010 | Cartales |
| 2011/0047350 | A1 | 2/2011 | Geissler et al. |
| 2011/0238546 | A1* | 9/2011 | Certain .................. G06Q 10/00 705/34 |
| 2012/0331135 | A1* | 12/2012 | Alon .................... H04L 41/044 709/224 |
| 2013/0297907 | A1* | 11/2013 | Ki ....................... G06F 12/0684 711/170 |
| 2014/0032748 | A1* | 1/2014 | Pruthi .................... H04L 43/04 709/224 |
| 2014/0047342 | A1 | 2/2014 | Breternitz et al. |
| 2014/0068348 | A1* | 3/2014 | Mondal .................. H04L 41/16 714/45 |
| 2014/0089735 | A1* | 3/2014 | Barrett ................ G06F 11/3495 714/27 |
| 2014/0115579 | A1 | 4/2014 | Kong |
| 2014/0201425 | A1 | 7/2014 | Clark et al. |
| 2014/0215465 | A1 | 7/2014 | Elzur |
| 2014/0280488 | A1 | 9/2014 | Voit et al. |
| 2014/0310434 | A1 | 10/2014 | Strange et al. |
| 2014/0351809 | A1* | 11/2014 | Chawla ............... G06F 9/45533 718/1 |
| 2014/0379894 | A1 | 12/2014 | Allen et al. |
| 2015/0071123 | A1 | 3/2015 | Sabaa |
| 2015/0081893 | A1* | 3/2015 | Chadwell .............. G06F 3/0659 709/224 |
| 2015/0135185 | A1 | 5/2015 | Sirota et al. |
| 2015/0222696 | A1 | 8/2015 | Park et al. |
| 2016/0006756 | A1 | 1/2016 | Ismael et al. |
| 2016/0098455 | A1* | 4/2016 | Curtin ............... G06F 17/30312 707/738 |
| 2016/0182328 | A1* | 6/2016 | Bhasin .................. H04L 43/067 709/224 |
| 2016/0275783 | A1 | 9/2016 | Lewonig |
| 2017/0034023 | A1* | 2/2017 | Nickolov ............ H04L 43/0817 |
| 2017/0093964 | A1 | 3/2017 | Barzik et al. |
| 2017/0126475 | A1* | 5/2017 | Mahkonen ............. H04L 43/04 |
| 2017/0329645 | A1 | 11/2017 | Chen et al. |

OTHER PUBLICATIONS

"Integral Single Document Storage and Retrieval Guide", p. 37, Integral SDS Procedures and Guidelines for Image Services, Release 4.1.2, Nov. 2008.

Darsana, "Integrating Cloud Service Deployment Automation with Software Defined Environments", 71 pages, Institute of Parallel and Distributed Systems, University of Stuttgart, 2014.

"Realizing the benefits of software-defined storage: an EMC perspective", 5-7, EMC White Paper, Sep. 2013.

Kalantar et al., "Weaver: Language and Runtime for Software Defined Environments", 13 pages, IBM Journal of Research and Development 58, No. 2/3, 2014.

"Software-*-Defined Storage and VMWARE's Virtual SAN Redefining Storage Operations" p. 2, The TANEJA Group, Inc. 2014Hopkinton, MA.

"VMware-Perspective-on-software-defined-storage-white-paper" pp. 6, 7, 11, 15, White Paper.

* cited by examiner

DATA TRAFFIC MONITORING TOOL

FIELD OF THE INVENTION

The present invention relates generally to computer networks, and specifically to a method for identifying and correcting problems in a data facility comprising two or more computers that communicate over a communications network.

BACKGROUND

In computer networking, network traffic control is the process of managing and controlling network data traffic in order to reduce network traffic impairments. For example, a network scheduler can manage Internet bandwidth. Network traffic control tools are used by network administrators to reduce congestion, latency and packet loss. This is part of bandwidth management. In order to use these tools effectively, it is necessary to measure the network traffic to determine the causes of network congestion and attack those problems specifically.

The description above is presented as a general overview of related art in this field and should not be construed as an admission that any of the information it contains constitutes prior art against the present patent application.

SUMMARY

There is provided, in accordance with an embodiment of the present invention a method, including detecting, on a communications network in a computing facility including a first computer coupled to a second computer via the communications network, an input/output (I/O) request conveyed from the first computer to the second computer, identifying, on the communications network, data traffic resulting from the second computer processing the I/O request, collecting network statistics based on the I/O request and the data traffic, detecting, based on the collected network statistics, a performance degradation of the computing facility, the performance degradation greater than a predetermined amount and identifying, based on the collected network statistics, a cause of the performance degradation.

There is also provided, in accordance with an embodiment of the present invention a computing facility, including a communications network, a first computer coupled to the communications network, and a second computer coupled to the communications network and configured to detect, on the communications network, an input/output (I/O) request conveyed from the first computer to the second computer, to identify, on the communications network, data traffic resulting from the second computer processing the I/O request, to collect network statistics based on the I/O request and the data traffic, to detect, based on the collected network statistics, a performance degradation of the computing facility, the performance degradation greater than a predetermined amount, and to identify, based on the collected network statistics, a cause of the performance degradation.

There is further provided, in accordance with an embodiment of the present invention a computer program product, the computer program product including a non-transitory computer readable storage medium having computer readable program code embodied therewith, the computer readable program code including computer readable program code configured to detect, on a communications network in a computing facility including a first computer coupled to a second computer via the communications network, an input/output (I/O) request conveyed from the first computer to the second computer, computer readable program code configured to identify, on the communications network, data traffic resulting from the second computer processing the I/O request, computer readable program code configured to collect network statistics based on the I/O request and the data traffic, computer readable program code configured to detect, based on the collected network statistics, a performance degradation of the computing facility, the performance degradation greater than a predetermined amount, and computer readable program code configured to identify, based on the collected network statistics, a cause of the performance degradation.

BRIEF DESCRIPTION OF THE DRAWINGS

The disclosure is herein described, by way of example only, with reference to the accompanying drawings, wherein.

DETAILED DESCRIPTION OF EMBODIMENTS

Embodiments of the present invention provide systems and methods for monitoring data traffic between two computers on a communications network in order to detect hardware and software problems in the communications network and/or the two computers. In some embodiments, a course of action can be recommended to solve the problem.

As described hereinbelow, an input/output (I/O) request conveyed from a first computer to a second computer in a computing facility is detected on a communications network coupling the first and the second computers. Upon identifying, on the communications network, data traffic resulting from the second computer processing the I/O request, network statistics based on the I/O request and the data traffic are collected. Based on the collected network statistics, a performance degradation of the computing facility is detected, and a cause of the performance degradation is identified. In embodiments of the present invention, if the performance degradation is greater than a predetermined amount, a remedy for the performance degradation can be identified, and the identified cause and remedy can be presented to a user.

Systems implementing embodiments of the present invention can use existing data traffic on the communications network to detect problems. In other words, when monitoring the communications network, embodiments described herein can be passive by not adding any additional network traffic. This can be useful in network environments having high utilizations where adding data traffic can further reduce performance of the networks or in systems where traversal of synthetic traffic for detecting such problems is not allowed (e.g., systems protected by by firewalls).

Figure 1:
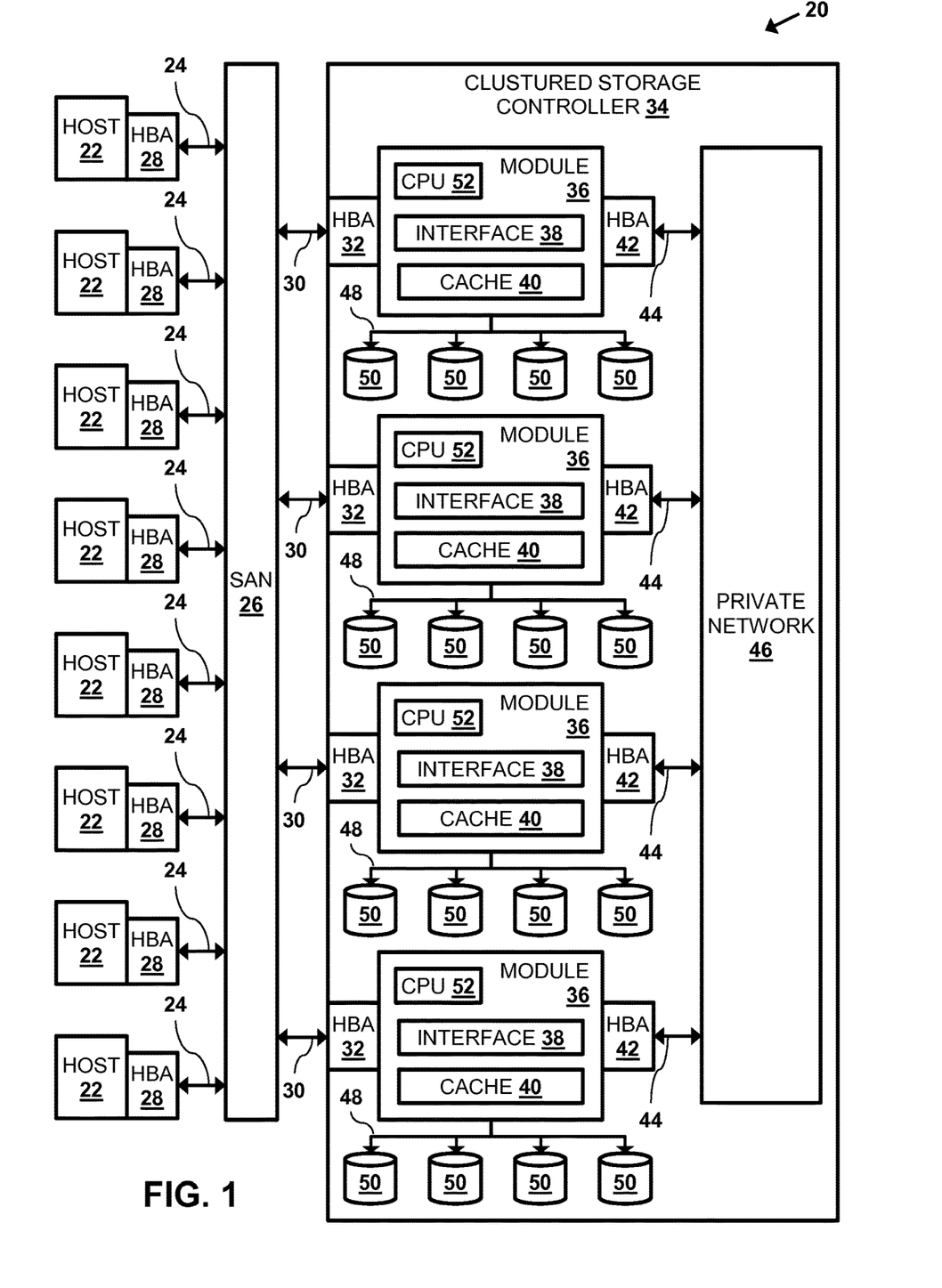
FIG. 1 is a block diagram that schematically illustrates a storage system comprising a storage controller comprising multiple modules configured to monitor data traffic between the modules and host computers, in accordance with an embodiment of the present invention.

FIG. 1 is a block diagram that schematically illustrates a data processing storage subsystem 20 (also referred to herein as a computing facility), in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes a processor 52, an interface 40 (in communication between adapters 32 and 42), and a cache 38. Each storage module 36 is responsible for a number of storage devices 50 by way of a data connection 48 as shown.

As described previously, each storage module 36 further comprises a given cache 38. However, it will be appreciated that the number of caches 38 used in storage subsystem 20 and in conjunction with clustered storage controller 34 may be any convenient number. While all caches 38 in storage subsystem 20 may operate in substantially the same manner and comprise substantially similar elements, this is not a requirement. Each of the caches 38 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 38 coupled to respective sets of storage devices 50. In some configurations, the sets of storage devices 50 comprise one or more hard disks, or solid state drives (SSDs) which can have different performance characteristics. In response to an I/O command, a given cache 38, by way of example, may read or write data at addressable physical locations of a given storage device 50. In the embodiment shown in FIG. 1, caches 38 are able to exercise certain control functions over storage devices 50. These control functions may alternatively be realized by hardware devices such as disk controllers (not shown), which are linked to caches 38.

Each storage module 36 is operative to monitor its state, including the states of associated caches 38, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 38 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

While the configuration in FIG. 1 shows storage controller 34 comprising four modules 36 and each of the modules coupled to four storage devices 50, a given storage controller 34 comprising any multiple of modules 36 coupled to any plurality of storage devices 50 is considered to be with the spirit and scope of the present invention.

Figure 2:
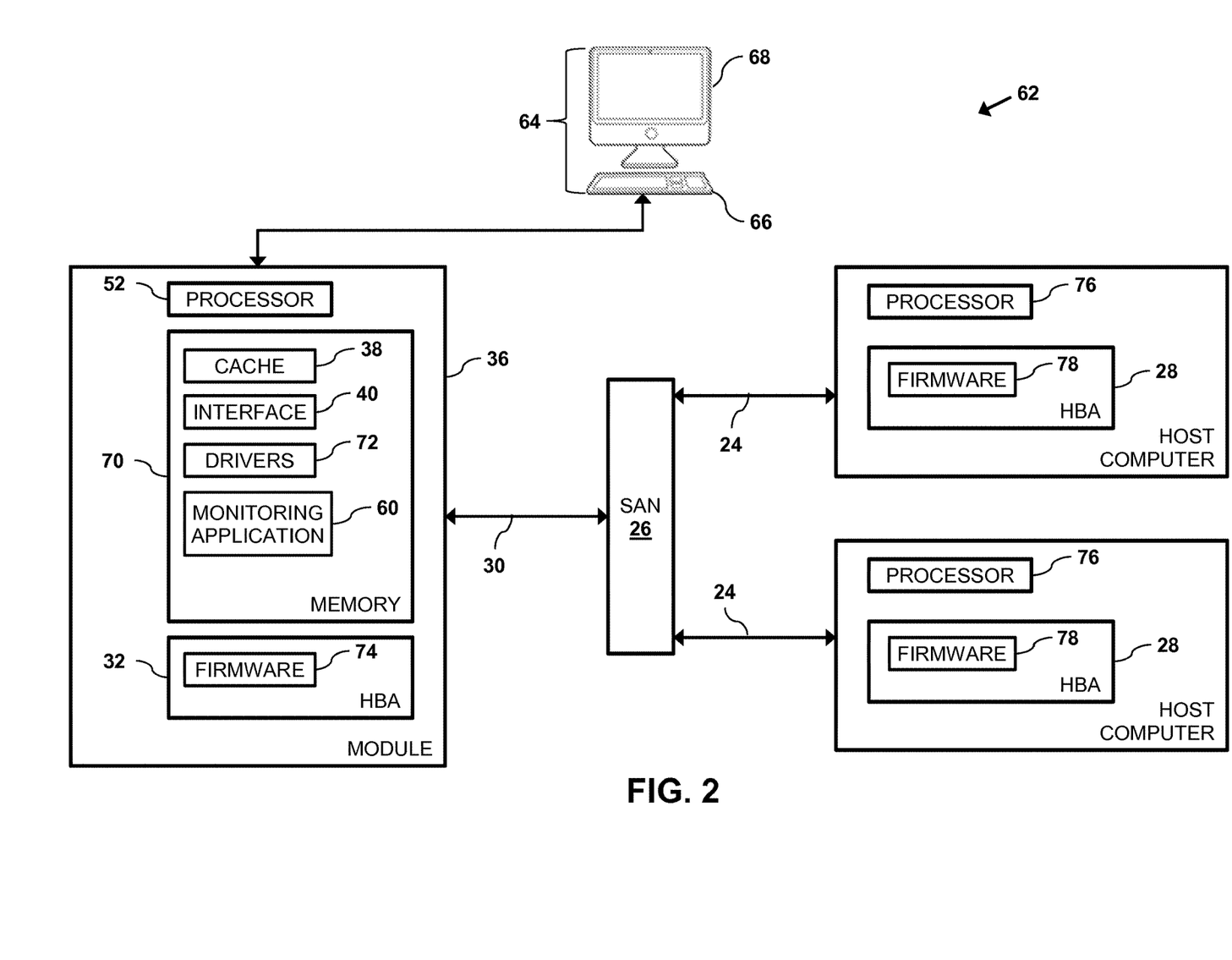
FIG. 2 is a block diagram that schematically illustrates a given module of the storage controller configured to monitor a the data traffic, in accordance with an embodiment of the present invention.

FIG. 2 is a block diagram that schematically illustrates a given module 36 configured to execute a monitoring application 60 that monitors data traffic on a communications network in a computing facility 62 comprising the given module and host computers 22 that are coupled to the communications network, in accordance with an embodiment of the present invention. In the configuration shown in FIG. 2, module 36 is coupled to a data terminal (e.g., a laptop computer) 64 comprising a keyboard 66 and a display 68.

In embodiments described herein, the communications network comprises multiple network segments that couple the given module to the given host computer. The network segments comprise cabling, connectors and networking hardware (e.g., switches and routers) that enable the given module and the given host computer to communicate with each other. In the example shown in FIG. 2, the data network segments comprise SAN 26 and connections 30 and 24.

In addition to processor 52 (also referred to as module processor 52) and HBA 32, module 36 comprises a memory 70 that stores cache 38, interface 40, device drivers 72 (also referred to herein simply as drivers 72) and monitoring application 60. Device drivers 72 comprise software application that operate or control a hardware device (e.g., HBA 32 and storage devices 50) coupled to module 36. Additionally, each HBA 32 comprises firmware 74 that comprises software that controls each the HBA in module 36.

In addition to HBA 28, each host computer 22 comprises a host processor 76. Each HBA 28 includes firmware comprising software that controls the HBA 28 in the host computer. In embodiments of the present invention, processor 52 executes monitoring application 60 that passively monitors (i.e., without introducing any additional data traffic) the communications network in order to detect any problems in the computing facility.

In operation, monitoring application monitors the communications network in order to identify numerous hardware, software and network issues such traffic congestion, routing problem, bad switch configurations, bad ports, bad cables, host side driver issues, guest side VM driver issues. Additionally, in configurations where a given network segment comprises an iSCSI connection, for each TCP session related to an iSCSI initiator, monitoring application 60 can monitor network statistics such as window sizes, round trip times, packet losses, congestion state of the TCP session, retransmit counts, TCP timer values, socket statistics, IP reordering information and IP conflicts.

If monitoring application 60 detects an "abnormal" (i.e., out of an expected range) network statistic, the monitoring application can issue an alert for related host-side health issue. Additionally, monitoring application 60 can detect related issues can using various techniques such standard deviation of the range of values, exponential moving average, etc.

In some embodiments, monitoring application 60 can detect problems such as quality issues, unused resources, and any faulty network segments between a given module 36 and a given host computer 22. In further embodiments, monitoring application 60 can distinguish between a SCSI layer read I/O operations, SCSI layer write I/O operations and alerts. In supplemental embodiments, monitoring application 60 can also use active monitoring techniques, e.g., by generating network traffic such as ICMP, port scans and active fingerprinting.

To detect problems in computing facility 61, monitoring application 60 can use complex heuristics on sets of network statistics to identify remedies comprising recommended actions and suggestions in order to improve client's health. Examples of remedies include, but are not limited to:
  Upgrading drivers 72, and firmware 74 and 78.
  Configuring bonding/teaming properly along the communications network.
  Changing network setting on host 22 and increase TCP read/write memory settings.
  Allocating more committed rate to host(s) 22 in QOS/traffic shaping /rate limiting.

While the example in FIG. 2 shows monitoring application 60 in a given module 36 monitoring data traffic between the given module and host computers 22, configuring the monitoring application to monitor data traffic between all modules 36 and all host computers 22 is considered to be within the spirit and scope of the present invention. Additionally, while the configuration in FIG. 2 shows monitoring data traffic on SAN 26 coupling storage controller 34 and host computers 22, monitoring data traffic between any two computers that communicate via any type of data network is considered to be within the spirit and scope of the present invention. Furthermore, while the example in FIG. 2 shows module 36 configured to process I/O requests and to monitor the communications network, a separate computer configured to use embodiments of the present invention to monitor the communications network is considered to be within the spirit and scope of the present invention.

Processors 52 comprise general-purpose central processing units (CPU) or special-purpose embedded processors, which are programmed in software or firmware to carry out the functions described herein. The software may be downloaded to modules 36 in electronic form, over a network, for example, or it may be provided on non-transitory tangible media, such as optical, magnetic or electronic memory media. Alternatively, some or all of the functions of processor 52 may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Passive Computing Facility Monitoring

Figure 3:
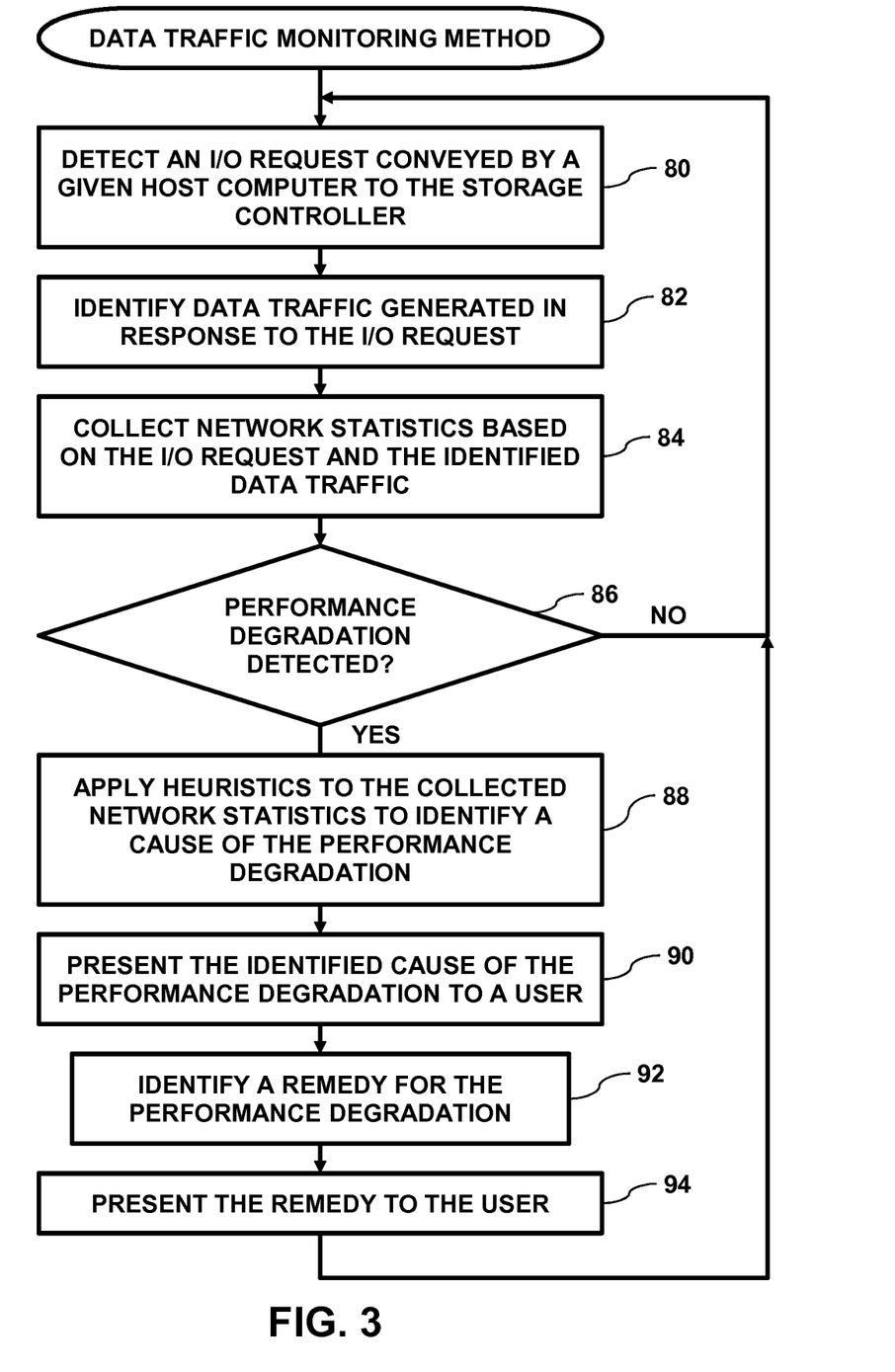
FIG. 3 is a flow diagram that schematically illustrates a method of monitoring the data traffic on a communications network, in accordance with an embodiment of the preset invention.

FIG. 3 is a flow diagram that schematically illustrates a method of monitoring data traffic between a given module 36 and a given host computer 22, in accordance with an embodiment of the present invention. In a detection step 80, monitoring application 60 detects, on the communications network, an I/O request conveyed from the given host computer to the given module, and in a first identification step 82, the monitoring application identifies, in response to the I/O request, data traffic on the communications network between the given host computer and the given module.

In a collection step 84, monitoring application 60 collects network statistics based on the I/O request and the subsequent data traffic. In a comparison step 86, if monitoring application 60 detects, based on the collected network statistics, a performance degradation greater than or equal to a predetermined amount, then in a second identification step 88, the monitoring application applies heuristics to the collected network statistics in order to identify a cause of the performance degradation.

For example, if monitoring application 60 detects a first number of retransmit counts of an IP address of a specific host greater than a predetermined threshold (i.e., number), and detects a second number of packet losses greater than a predetermined threshold (i.e., number) for the packet losses, heuristics may indicate a problem with firmware 78 in the given host computer. In addition to the network statistics for I/O request and the data traffic generated in response the I/O request, monitoring application 60 using any recent network statistics collected from the communications network to help detect the performance degradation is considered to be within the spirit and scope of the present invention.

In a first presentation step 90, the monitoring application presents the identified cause on display 68. The identified cause comprises a location and a category. In embodiments herein, the location typically comprises the network segments coupling the given host computer to the given module, the given module, or the given host computer (and their respective components), and the category typically comprises a hardware problem, a software problem or a configuration problem.

In a third identification step 92, monitoring application 60 identifies a remedy for the detected problem. In some embodiments, monitoring application 60 can use heuristics to identify the remedy. In operation, the heuristics used by monitoring application 60 in steps 88 and 92 can indicate, based on the collected network statistics, a specific cause for the detected performance degradation, and a corresponding remedy for the cause.

In a second presentation step 94, monitoring application 60 presents the remedy to a user on display 68, and the method continues with step 80. Returning to step 86, if monitoring application 60 does not detect a performance degradation greater than the predetermined amount, then the method continues with step 80.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
    detecting, on a communications network in a computing facility comprising a first computer coupled to a second computer via the communications network, an input/output (I/O) request conveyed from the first computer to the second computer;
    identifying, on the communications network, data traffic resulting from the second computer processing the I/O request;
    collecting network statistics based on the I/O request and the data traffic by a monitoring application executing on the second computer responding to the I/O request, the monitoring application passively eavesdropping on the data traffic between the first computer and the second computer such that the monitoring application does not add any additional data traffic to the communications network; wherein the communications network includes at least one Internet Small Computer Systems Interface (iSCSI) connection and, commensurate with collecting the network statistics, the monitoring application distinguishes between SCSI layer read operations, SCSI layer write operations, and system alerts; and wherein the collection of network statistics further includes monitoring, by the monitoring application, each Transmission Control Protocol (TCP) session associated with an iSCSI initiator to identify the network statistics comprising at least window sizes, round trip data times, packet losses, retransmit counts, TCP timer values, socket statistics, and a congestion state of each respective TCP session;
    detecting, based on the collected network statistics, a performance degradation of the computing facility, the performance degradation greater than a predetermined amount; wherein distinguishing the SCSI layer read operations, SCSI layer write operations, and system alerts comprises isolating the performance degradation, by the monitoring application, to one of the SCSI layer read operations, SCSI layer write operations, and system alerts;
    identifying, based on the collected network statistics, a cause of the performance degradation; wherein identifying the cause comprises applying heuristics, by the monitoring application executing on the second computer, to each of the collected network statistics associated with the I/O request having the performance degradation greater than the predetermined amount in addition to historical network statistics; and
    automatically presenting the cause of the performance degradation and an identified remedy to the performance degradation to the user via a display; wherein the identified remedy includes at least one of reconfiguring bonding or teaming along the communications network, increasing TCP read and write memory settings, and allocating additional committed rate to the first computer and the second computer.

2. The method according to claim 1, wherein the first computer comprises a host computer, and wherein the second computer comprises a storage controller.

3. The method according to claim 1, and comprising identifying, based on the heuristics, the remedy to the detected performance degradation.

4. The method according to claim 3, wherein the communications network comprises one or more network segments, and wherein the cause comprises a location selected from a group consisting of a given network segment and the second computer.

5. The method according to claim 3, wherein the cause comprises a category selected from a group consisting of a hardware problem, a software problem and a configuration problem.

6. A computing facility, comprising:
    a communications network;
    a first computer coupled to the communications network; and
    a second computer coupled to the communications network and configured:
        to detect, on the communications network, an input/output (I/O) request conveyed from the first computer to the second computer,
        to identify, on the communications network, data traffic resulting from the second computer processing the I/O request,
        to collect network statistics based on the I/O request and the data traffic by a monitoring application executing on the second computer responding to the I/O request, the monitoring application passively eavesdropping on the data traffic between the first computer and the second computer such that the monitoring application does not add any additional data traffic to the communications network; wherein the communications network includes at least one Internet Small Computer Systems Interface (iSCSI) connection and, commensurate with collecting the network statistics, the monitoring application distinguishes between SCSI layer read operations, SCSI layer write operations, and system alerts; and wherein the collection of network statistics further includes monitoring, by the monitoring application, each Transmission Control Protocol (TCP) session associated with an iSCSI initiator to identify the network statistics comprising at least window sizes, round trip data times, packet losses, retransmit counts, TCP timer values, socket statistics, and a congestion state of each respective TCP session,
        to detect, based on the collected network statistics, a performance degradation of the computing facility, the performance degradation greater than a predetermined amount; wherein distinguishing the SCSI layer read operations, SCSI layer write operations, and system alerts comprises isolating the performance degradation, by the monitoring application, to one of the SCSI layer read operations, SCSI layer write operations, and system alerts, to identify, based on the collected network statistics, a cause of the performance degradation; wherein identifying the cause comprises applying heuristics, by the monitoring application executing on the second computer, to each of the collected network statistics associated with the I/O request having the performance degradation greater than the predetermined amount in addition to historical network statistics, and to automatically present the cause of the performance degradation and an identified remedy to the performance degradation to the user via a display; wherein the identified remedy includes at least one of reconfiguring bonding or teaming along the communications network, increasing TCP read and write memory settings, and allocating additional committed rate to the first computer and the second computer.

7. The computing facility according to claim 6, wherein the first computer comprises a host computer, and wherein the second computer comprises a storage controller.

8. The computing facility according to claim 6, wherein the second computer is configured to identify, based on the heuristics, the remedy to the detected performance degradation.

9. The computing facility according to claim 8, wherein the communications network comprises one or more network segments, and wherein the cause comprises a location selected from a group consisting of a given network segment and the second computer.

10. The computing facility according to claim 8, wherein the cause comprises a category selected from a group consisting of a hardware problem, a software problem and a configuration problem.

11. A computer program product, the computer program product comprising:

a non-transitory computer readable storage medium having computer readable program code embodied therewith, the computer readable program code comprising:

computer readable program code configured to detect, on a communications network in a computing facility comprising a first computer coupled to a second computer via the communications network, an input/output (I/O) request conveyed from the first computer to the second computer;

computer readable program code configured to identify, on the communications network, data traffic resulting from the second computer processing the I/O request;

computer readable program code configured to collect network statistics based on the I/O request and the data traffic by a monitoring application executing on the second computer responding to the I/O request, the monitoring application passively eavesdropping on the data traffic between the first computer and the second computer such that the monitoring application does not add any additional data traffic to the communications network; wherein the communications network includes at least one Internet Small Computer Systems Interface (iSCSI) connection and, commensurate with collecting the network statistics, the monitoring application distinguishes between SCSI layer read operations, SCSI layer write operations, and system alerts; wherein the communications network includes at least one Internet Small Computer Systems Interface (iSCSI) connection; and wherein the collection of network statistics further includes monitoring, by the monitoring application, each Transmission Control Protocol (TCP) session associated with an iSCSI initiator to identify the network statistics comprising at least window sizes, round trip data times, packet losses, retransmit counts, TCP timer values, socket statistics, and a congestion state of each respective TCP session;

computer readable program code configured to detect, based on the collected network statistics, a performance degradation of the computing facility, the performance degradation greater than a predetermined amount; wherein distinguishing the SCSI layer read operations, SCSI layer write operations, and system alerts comprises isolating the performance degradation, by the monitoring application, to one of the SCSI layer read operations, SCSI layer write operations, and system alerts;

computer readable program code configured to identify, based on the collected network statistics, a cause of the performance degradation; wherein identifying the cause comprises applying heuristics, by the monitoring application executing on the second computer, to each of the collected network statistics associated with the I/O request having the performance degradation greater than the predetermined amount in addition to historical network statistics; and computer readable program code configured to automatically present the cause of the performance degradation and an identified remedy to the performance degradation to the user via a display; wherein the identified remedy includes at least one of reconfiguring bonding or teaming along the communications network, increasing TCP read and write memory settings, and allocating additional committed rate to the first computer and the second computer.

12. The computer program product according to claim 11, wherein the first computer comprises a host computer, and wherein the second computer comprises a storage controller.

13. The computer program product according to claim 11, and comprising computer readable program code configured to identify, based on the heuristics, the remedy to the detected performance degradation.

14. The computer program product according to claim 13, wherein the communications network comprises one or more network segments, and wherein the cause comprises a location selected from a group consisting of a given network segment and the second computer.

15. The computer program product according to claim 13, wherein the cause comprises a category selected from a group consisting of a hardware problem, a software problem and a configuration problem.

* * * * *